(12) United States Patent
Sobiech (10) Patent No.: US 8,872,045 B2
(45) Date of Patent: *Oct. 28, 2014

(54) FILLING DEVICE WITH VERTICALLY ARRANGED WEIGHING DEVICE

(75) Inventor: Bernd Sobiech, Regensburg (DE)

(73) Assignee: Krones AG, Neutraubling (DE)

( * ) Notice: Subject to any disclaimer, the term of this patent is extended or adjusted under 35 U.S.C. 154(b) by 402 days.

This patent is subject to a terminal disclaimer.

(21) Appl. No.: 13/241,424

(22) Filed: Sep. 23, 2011

(65) Prior Publication Data

US 2012/0073883 A1 Mar. 29, 2012

(30) Foreign Application Priority Data

Sep. 24, 2010 (DE) .......................... 10 2010 041 351

(51) Int. Cl.
| | | |
|---|---|---|
| G01G 13/00 | (2006.01) | |
| B67C 3/20 | (2006.01) | |
| B65B 3/28 | (2006.01) | |

(52) U.S. Cl.
CPC .................................... *B67C 3/202* (2013.01)
USPC .............................. 177/116; 177/118; 141/83

(58) Field of Classification Search
USPC ..................... 177/116, 118; 141/83
See application file for complete search history.

(56) References Cited

U.S. PATENT DOCUMENTS

| | | | | |
|---|---|---|---|---|
| 4,329,881 A | * | 5/1982 | Schloss ...................... 73/862.08 |
| 4,957,177 A | * | 9/1990 | Hamilton et al. ............. 177/211 |
| 5,895,894 A | * | 4/1999 | Zumbach ....................... 177/180 |
| 6,073,667 A | * | 6/2000 | Graffin ........................... 141/372 |
| 6,399,901 B1 | * | 6/2002 | Nishino et al. ................... 177/52 |
| 6,667,444 B1 | * | 12/2003 | Armitage ......................... 177/168 |
| 8,245,738 B2 | * | 8/2012 | Neumayer ....................... 141/83 |
| 8,525,051 B2 | * | 9/2013 | Hauck et al. ................... 177/124 |
| 2010/0132832 A1 | * | 6/2010 | Neumayer ....................... 141/83 |
| 2012/0060973 A1 | * | 3/2012 | Jaeger et al. ..................... 141/83 |

FOREIGN PATENT DOCUMENTS

| | | |
|---|---|---|
| CH | 681291 A5 | 2/1993 |
| CN | 1276825 A | 12/2000 |
| CN | 101746698 A | 6/2010 |
| DE | 4325836 A1 | 2/1995 |
| DE | 102007014639 A1 | 9/2008 |
| DE | 102008006409 A1 | 7/2009 |
| DE | 10 2009 011 949 B3 | 7/2010 |

(Continued)

OTHER PUBLICATIONS

Machine translation of the detailed description of DE 4325836 from the EPO website, May 5, 2014.*

(Continued)

*Primary Examiner* — Randy W Gibson
(74) *Attorney, Agent, or Firm* — Marshall, Gerstein & Borun LLP (57) ABSTRACT

A filling device for containers, especially for beverage bottles, having a filling valve with a discharge opening, a holder for the container in a suspended arrangement, and a weighing device. In order to obtain a robust weighing device and a more precise measurement at least one portion of the weighing device is arranged vertically above the discharge opening.

9 Claims, 5 Drawing Sheets

(56) References Cited

FOREIGN PATENT DOCUMENTS

| | | |
|---|---|---|
| EP | 0314889 A2 | 5/1989 |
| EP | 1 025 424 A1 | 8/2000 |
| EP | 2194020 A2 | 6/2010 |
| GB | 831936 A | 4/1960 |
| JP | 2005126077 A | 5/2005 |
| JP | 2005231644 A | 9/2005 |
| JP | 2005231664 A | 9/2005 |
| JP | 4534372 B2 | 9/2010 |
| WO | WO-2008116526 A2 | 10/2008 |
| WO | WO-2010102756 A2 | 9/2010 |

OTHER PUBLICATIONS

European Search Report for 11179176.0, dated Jan. 23, 2012.
German Search Report issued on Jun. 9, 2011 in DE 10 2010 041 351, and partial translation thereof.
Notification of the First Office Action, The State Intellectual Property Office of the People's Republic of China, Application No. 201110291588.7 dated Oct. 28, 2013.

* cited by examiner

FILLING DEVICE WITH VERTICALLY ARRANGED WEIGHING DEVICE

CROSS-REFERENCE TO RELATED APPLICATION

The present application claims the benefit of priority of German Application No. 102010041351.8, filed Sep. 24, 2010. The entire text of the priority application is incorporated herein by reference in its entirety.

FIELD OF THE DISCLOSURE

The disclosure relates to a filling device for containers, especially for beverage containers, of the type using a weighing device.

BACKGROUND

A filling device of this type is known from EP 1 025 424. The known filling device includes one of the usual filler carrousels, which run around a substantially perpendicular axis and are provided on their outer circumference with radially projecting holders for the containers. Typically, the holders are designed like tongs. The two jaws of the tongs are drawn towards each other under the load of a spring and define a recess that is adapted to the container, and by means of which the holder grips around the container for the filling thereof. Usually bottles are filled which, underneath the filling hole, are provided with a projecting flange at their neck, said flange resting on the top side of the holder. For the filling, a filling valve is provided which, in the filling position, has its outlet coaxially aligned with the filling hole of the container. By operating the filling valve a predetermined quantity of the product is filled into the container. In order to control the filling status the container is weighed. For this purpose a weighing device is provided, which includes an elastically deformable element in the form of an elastic bar that is rigidly secured to the structure, whose deformation by the weight of the container is ascertained and assessed as a measure for the weight. The elastic element is acted on by the holder, with the elastic element and the holder being placed side by side in the radial direction relative to the axis of rotation of the filler carrousel. The holder serves here as a lever arm to act on the elastically deformable bar. However, due to this horizontally and radially extending arrangement the known weighing device is relatively sensitive to vibrations generated during the operation, which are induced by the rotation of the filler carrousel or by the forces acting for a short time on the containers, or the like. These vibrations can distort the weighing result.

In JP-2005126077 the weight sensor is arranged laterally above the filling valve outlet on a carrier for the filling valve. With respect to the filling valve outlet the lead-through aperture for the carrier member for the bottle is offset in a radially inward direction, is sealed with a bellows and has a very complex design. Usually, there is very little free space in the radially inner area of the carrousel. Therefore, internal attachments should largely be avoided. The complex bottle holder is located in the splash area of the product.

Other functional units that are possibly provided in this area could be affected in terms of their function by product splashes. If used for cold aseptic filling this area has to be cleaned and disinfected with aggressive media, which media could likewise affect the function. Moreover, such internal attachments come along with constructive undercuts in which a reliable cleaning and disinfection is impossible or at least difficult.

In addition, maintenance and servicing of machine components inside the carrousel is complicated by the reduced accessibility.

JP-2005231664 discloses a filling member with a weighing device. In this case, too, the bottle is centered by the weighing device underneath the filling valve outlet with a lateral overhang. The power transmission from the carrier member to the weighing device is very complex, however. The statements made with respect to the internal attachments concerning JP-2005126077 apply here analogously.

SUMMARY OF THE DISCLOSURE

The disclosure is based one aspect to provide a filling device comprising a robust, reliable weighing device.

The inventive arrangement of the weighing device at least in part vertically above the discharge opening of the filling valve allows a connection between the container and the weighing device that is substantially protected against vibrations in the gravity direction.

Usefully, the holder is directly connected to the weighing device by at least one arm which runs substantially perpendicular.

An even better protection against undesired vibrations is provided by a weighing device that is arranged substantially symmetrically with respect to the filling axis, with the connection between the weighing device and the container holder being provided on two opposing sides of the filling axis.

Preferably, the carrier member is led through a part of the frame so as to be additionally protected against unintended contacts and vibrations caused by these contacts.

Preferably, the lead-through aperture for the carrier member through the frame is sealed on one and/or both sides so as to prevent product splashes from entering the weighing device and/or impurities from entering the container to be filled from above the frame.

To obtain an enhanced protection against vibrations the carrier member may also be received in a bearing, which should in particular be accomplished without friction so that the vertical measurement motion of the carrier member is not affected by friction forces. Preferably, a frictionless support is accomplished in the form of a magnetic bearing, wherein the bearing fixtures may be fixable in an exchangeable manner.

The filling of the containers is accomplished through a discharge opening of the filling valve arranged in a free space in the carrier member, because this facilitates a symmetrical arrangement of the weighing device and the container substantially vertically on top of each other. Preferably, the carrier member has two opposite arms between which the discharge opening and its supply line may be accommodated.

Preferably, the supply line is directly led through the frame, either directly through a duct integrally formed in the frame or through a duct accommodated in a hollow space in the frame.

Preferably, the discharge opening is closable so that the area of the filling station contacted by the product can be cleaned in a hygienically impeccable manner and automatically, without there being a risk that the weighing device is damaged by wetness or possibly aggressive cleansing agents.

BRIEF DESCRIPTION OF THE DRAWINGS

Embodiments of the disclosure will be explained in more detail below by means of the drawings. In the drawings.

DETAILED DESCRIPTION OF THE PREFERRED EMBODIMENT

Figure 1:
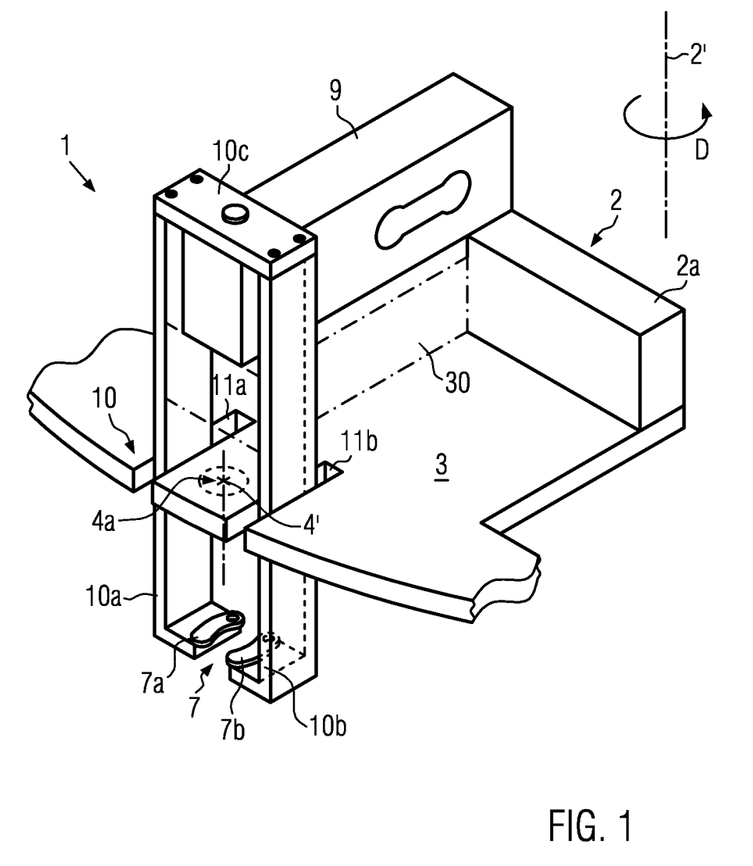
FIG. 1 shows a perspective view of a portion of the filling device according to the disclosure.

FIG. 1 shows a perspective view of a filling device 1 as part of a filling plant for the filling of beverages, which is, for example, a conventional filler carrousel. The filling plant includes a frame 2 which is driven to rotate about a substantially vertical axis of rotation 2' in the direction of rotation D. In the embodiment shown merely a portion of an outer carrier part 2a, which belongs to the frame and extends about the axis of rotation 2', can be seen, on which a plurality of substantially identical filling devices 1 are mounted in a manner distributed about the axis of rotation 2'.

A carrier 3 is arranged on the carrier part 2a, which extends beyond the carrier part 2a in the radial direction relative to the axis of rotation 2'. This carrier 3 is designed as a valve receptacle for a filling valve 4. The filling valve 4 is of a common type and is connected by a supply line 5 and by shut-off members 6 to a source for the product to be filled in, especially a beverage supply. The filling valve 4 is arranged in such a way that its discharge opening 4a is arranged with a substantially perpendicular center line 4' and a substantially horizontal orientation.

Figure 6:
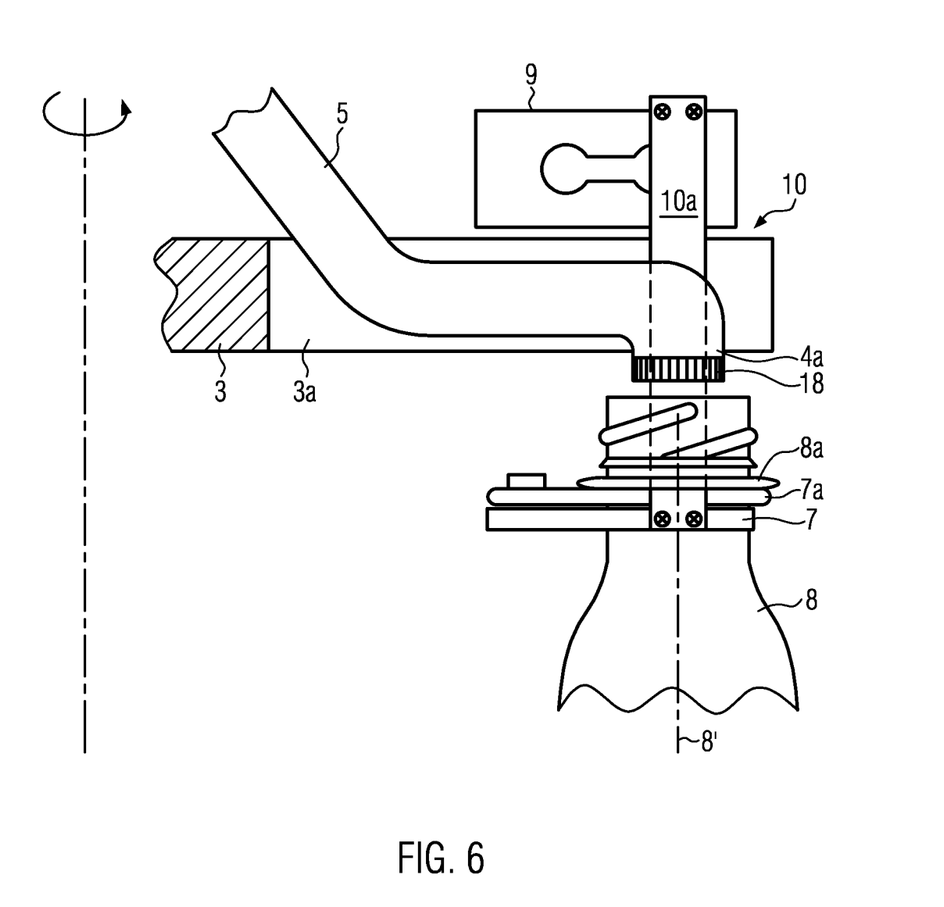
FIG. 6 shows a lateral view of another embodiment of a filling device according to the disclosure.

Vertically underneath the discharge opening 4a there is provided a holder 7 for containers 8 to be filled (FIG. 6). Illustrated are bottles with a handling flange 8a provided at the neck, and a container center line 8'. The holder 7, which is conventionally designed as tongs, includes lateral jaws 7a and 7b which have a receiving hole adapted to the container and an upper bearing surface for the handling flange 8a, and which are loaded in their closed position by a non-illustrated spring or by magnets. The spring force or magnetic force is of such a nature that the jaws 7a, 7b move apart from each other if a container 8 is pressed against the jaws inwardly in the radial direction with respect to the axis of rotation 2', and move towards each other again into the closed position as soon as the container 8 has arrived in the recess defined by the jaws. By this, the jaws 7a, 7b move under the handling flange 8a and retain the container 8 for the filling thereof freely suspended in a substantially axial orientation of the container axis 8' relative to the filling axis 4'.

In the embodiment shown the jaws 7a, 7b of the holder 7 are secured to a weighing device 9. Any construction capable of detecting a weight freely suspended thereon may be used as weighing device. Preferably, the weighing device is a weighing cell with an elastic bar (including strain gauges), but may also be a weighing device of the parallelogram type, or correspondingly sensitive pressure sensors such as piezo-systems.

By means of the weighing device weight-dependent signals are outputted to a controller (not shown) for the respectively associated filling valve 4. This controller is preferably a master-slave controller with slave control units each for at least one filling valve and a master controller on which the operator, too, inputs various parameters that are specific for the filling process.

At least a portion of the weighing device is located vertically above the discharge opening 4a of the filling valve 4, i.e. it is penetrated by the filling axis 4', and is therefore protected against product splashes from the discharge opening 4a by the mounting structure, i.e. the carrier 3. Depending on the shape of the weighing device 9, this weighing device is arranged in full symmetry with respect to the filling axis 4' or, as shown in the figures, only in the direction of rotation D symmetrically on both sides of the filling axis 4', and extends from the filling axis 4' in the radial direction inwardly towards the axis of rotation 2'.

To this end, the holder 7 is directly suspended from the weighing device 9 by means of a carrier member 10. The carrier member 10 comprises at least one arm, in the preferred embodiment two arms 10a, 10b each of which carries one of the jaws 7a, 7b. The arms 10a, 10b run parallel to each other and extend substantially vertically. In the embodiment shown, dimensional differences between the width of the weighing device 9 and the width of the holder 7 are compensated by a yoke 10c, so that a strictly perpendicular extension of the arms 10a, 10b is ensured. Where appropriate, the carrier member 10 may be self-aligning, i.e. it may be pivotably fastened in such a way that it maintains its optimum position perpendicularly underneath the weighing device 9 under the action of gravity. The vertical height of the carrier member 10 should be as small as possible so as to keep the distance between the container orifice and the weighing device as short as possible, i.e. to assign the holder 7 to the weighing device 9 as closely as possible.

The weighing device 9 is connected to the frame 2 which, if the weighing device 9 is designed as an elastic bar, is accomplished at the end opposite the attachment of the carrier member 10. The arm(s) 10a, 10b is/are here the only attachment for the holder 7 and, thus, for the container 8 on the frame 2. The arms 10a, 10b engage the weighing device 9 symmetrically with respect to the filling axis 4' and at the same distance to the filling axis 4', the distance to the filling axis 4' being kept as small as is permitted by the neck diameter of the container 8 in order to minimize or avoid a leverage. The arms 10a, 10b are provided on the leading and trailing sides of the weighing device 9 with respect to the direction of rotation D.

The carrier member 10 is led through the mounting structure of the discharge opening 4a of the filling valve 4, in the embodiment shown through the valve carrier 3. For this purpose, apertures 11a and 11b are provided in the carrier 3. In the embodiment shown the apertures 11a, 11b are designed as parallel slots that are open on the circumference, so that the carrier member 10 is easy to mount. The dimensions of the slots 11a, 11b are greater on all sides than the dimensions of the arms 10a, 10b extending through the respective aperture 11a, 11b, so that the weighing results are not distorted by an unintended friction of the arms 10a, 10b on the carrier 3.

Figure 8:
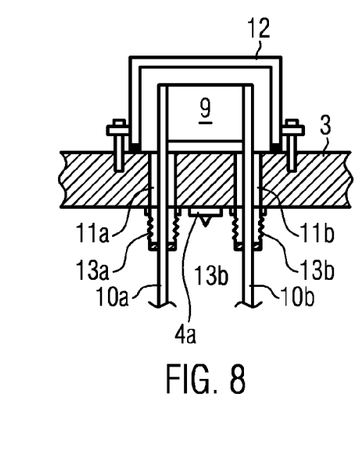
FIG. 8 shows a front view of a portion of a carrier member of a filling device according to the disclosure.
Figure 9:
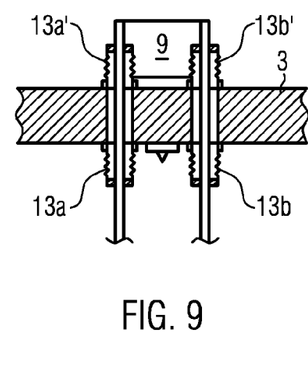
FIG. 9 shows a lateral view of another embodiment of a carrier member of a filling device according to the disclosure.
Figure 10:
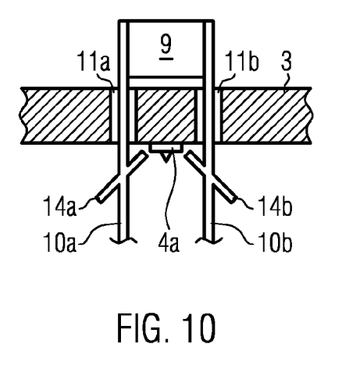
FIG. 10 shows another embodiment of a carrier member of a filling device according to the disclosure.

If the carrier 3 is not enough as a splash protection against product splashes or as a protection for the cleaning of the weighing device 9 (e.g. in ESL (extended shelf life) plants or for cold aseptic filling) the apertures 11a, 11b can be sealed towards one side or both sides in the axial direction, which can for example be seen in FIGS. 8 to 10. As is shown in FIG. 8, the sealing may be accomplished with a housing 12 put over the weighing device 9 and over the part of the carrier member 10 projecting over the carrier 3, which housing 12 is detachably secured to the carrier 3 in an appropriate manner using sealing means. In the downward direction the sealing can be accomplished, for example, by a bellows 13a, 13b respectively, which are each secured around the associated aperture 11a and 11b and the associated arm 10a and 10b. The sealing may also be accomplished by a bellows 13a and 13'a as well as 13b and 13'b respectively disposed above and underneath the carrier 3. The easiest way of sealing is shown in FIG. 10, where a protection shield 14a and 14b is secured on the respective arm 10a, 10b underneath the carrier 3, which is in each case inclined outwardly from the discharge opening 4a and projects over the respective arm 10a, 10b on all sides. Thus, it is prevented that product splashes come through the apertures 11a, 11b as far as the weighing device 9 or that impurities fall into the container from above the carrier 3 through the apertures 11a, 11b, respectively. Thus, an adverse effect on the weighing process caused by the rigidity of a bellows is avoided.

Figure 11:
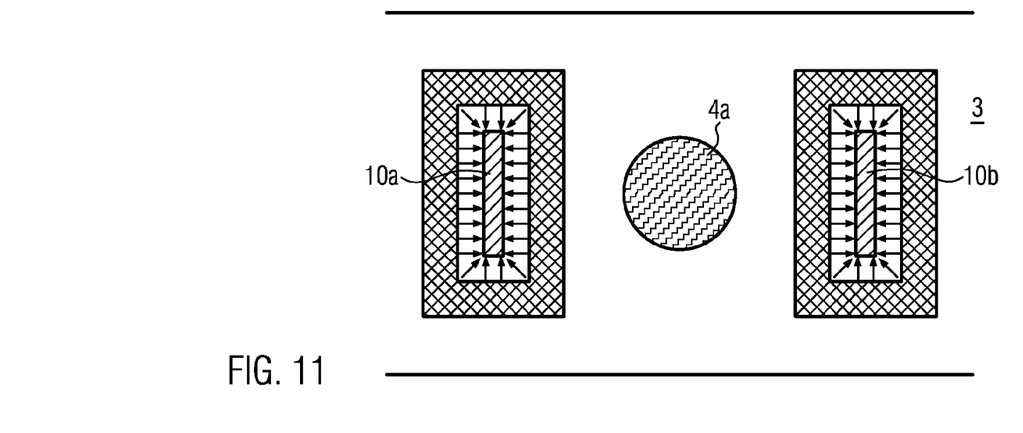
FIG. 11 shows a top view of a support of a carrier member.

The embodiments according to FIGS. 8 and 9 also allow the cleaning of the outer area of the filling device without enabling cleansing agents to flow through the apertures 11a, 11b.

Where appropriate, bearing constructions may be installed inside the apertures 11a, 11b which support the carrier member 10 radially and laterally without affecting it in the vertical measurement motion by friction forces. A particularly advantageous bearing is a magnetic bearing as shown, for example, in FIG. 11. At least one portion of the respective arm 10a and/or 10b is made from a magnetic or magnetizable material. Permanent magnets or electromagnets are mounted around the aperture 11a and/or 11b, by means of which the respective arm 10a, 10b is confined without friction both radially (centrifugal forces) and tangentially (starting/brake acceleration of the filling plant).

Figure 2:
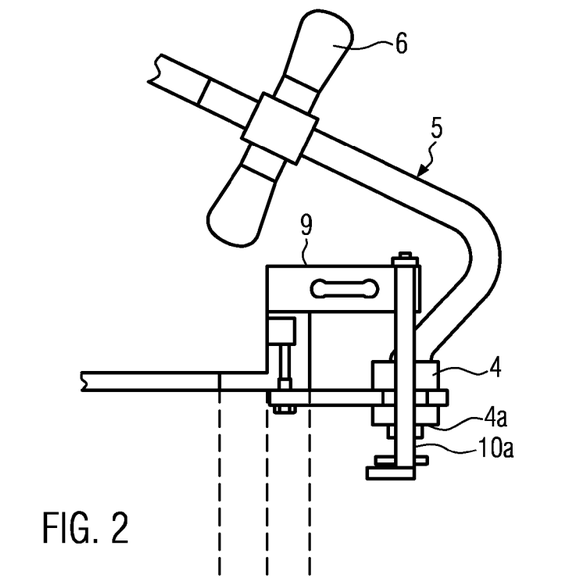
FIG. 2 shows the lateral view of a portion of a filling device according to the disclosure.
Figure 3:
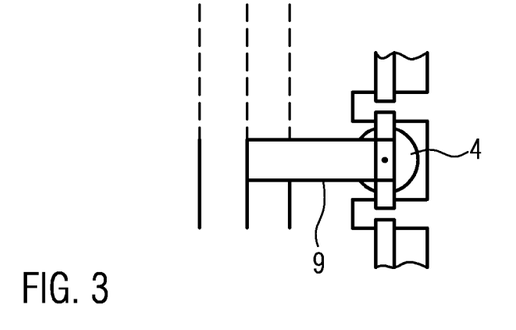
FIG. 3 shows the top view of a filling device according to the disclosure.
Figure 4:
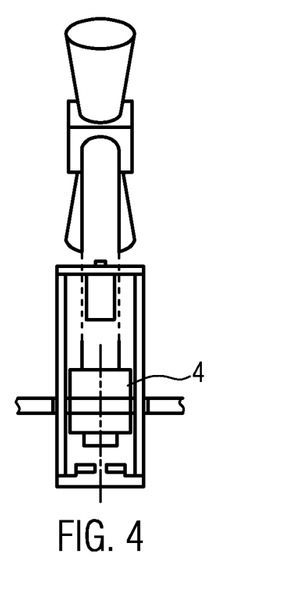
FIG. 4 shows the lateral view of a filling device according to the disclosure.
Figure 5:
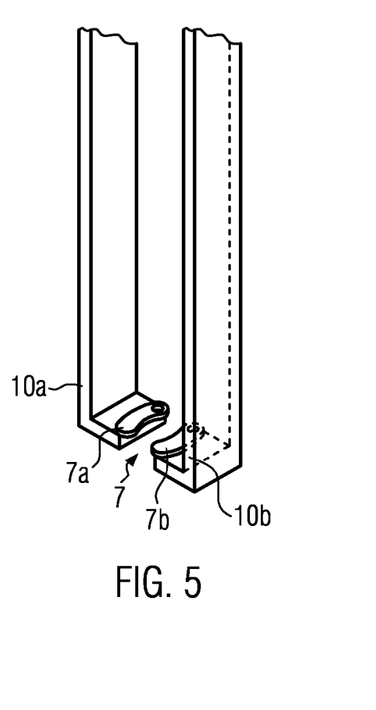
FIG. 5 shows a portion of a carrier member for the filling device according to the disclosure.

The carrier member 10 is designed to provide a free space for receiving the filling valve 4 and/or its discharge opening 4a as well as the supply line 5 thereof. As shown in FIG. 2, the supply line 5 can be led, for example in the form of a solid duct, across the weighing device 9 and, from a radial outward direction, right between the parallel arms 10a, 10b so as to reach the filling valve 4 located centrally between the arms 10a, 10b and/or the discharge opening 4a thereof.

Figure 7:
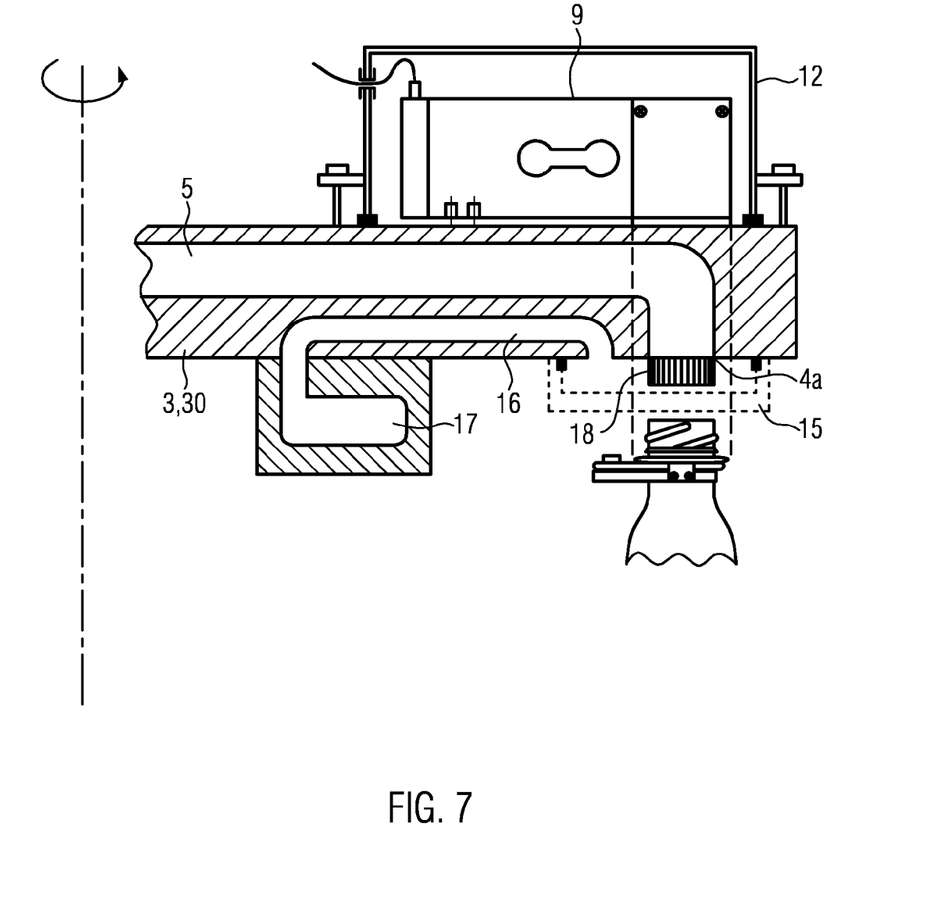
FIG. 7 shows a lateral view of another embodiment of a filling device according to the disclosure.

As shown in FIG. 6, the supply line 5 may also be guided as a hose or solid duct through a hollow space 3a, which extends in the carrier 3, right between the arms 10a, 10b of the carrier member 10. Finally, as shown in FIG. 7, the supply line may directly be incorporated into the frame or, as shown, into the carrier 3.

The discharge opening 4a of the filling valve 4 can in all embodiments be sealed by a protective cap (CIP cap or dummy bottle) 15, which is inserted automatically or manually in order to perform an automatic cleansing of the filling plant. To this end, a return pipe 16 into a return channel 17 is provided in a manner known per se, which ends next to the discharge opening 4a and is short-circuited with the product line 5 by means of the protective cap 15.

The carrier member 10 should be designed to keep the length of the arms 10a, 10b as short as possible. This means that the projecting length above the carrier 3 should be as small as possible, which is optimally realized by the embodiment according to FIGS. 6 and 7, in which the weighing device 9 sits directly on the carrier 3 or on a possibly provided adapter 30 (FIG. 1). Underneath the carrier 3 or the adapter 30 there should only be as much space as necessary, in other words, the container above the neck flange 8a, possibly the discharge opening 4a projecting over the carrier or adapter, possibly the protective cap 15 and possibly a gas lock 18 (FIGS. 6 and 7) have to be accommodated. The gas lock 18 prevents the product from dripping out of the discharge opening 4a if the accommodation of the filling valve 4 is physically separated from the discharge opening 4a (FIG. 2). In the embodiment according to FIG. 7 the protective cap 15 is designed to allow the simultaneous cleaning also of the gas lock 18.

The filling device according to the disclosure is suited for the most different filling stations. As described in the embodiment, these may be part of a filling plant having continuously operated rotary machines. Of course, the use in clocked machines is conceivable as well. The fact that the carrier member is led through frame parts or carrier parts is particularly advantageous in respect of cold aseptic filling plants or ESL plants (ESL=extended shelf life), in which case particularly the embodiment with the bellows sealings with or without housing is employed.

Usually, the product is supplied from a product tank installed on top of the carrousel through individual product lines to the respective filling valves. A direct supply from a rotary media distributor is possible as well, whereby the preliminary product container is, in this case, preferably placed closely next to the filling plant. The supply is here accomplished from above into the filling valve housing. Preferably, this can be accomplished if the product valve (also a double valve for generating different filling speeds) is installed directly in the product line instead of above the product discharge opening, with the gas lock 18 being installed at the filling valve outlet so as to prevent the product from dripping out of the discharge opening 4a.

As shown in FIG. 2, the product supply can be guided around the weighing cell. Preferably, the supply is guided by the shortest route, however, from the product vessel/rotary media distributor to directly underneath the weighing cell.

According to a modification of the described and illustrated embodiments the carrier member may also include only one arm or, for example, be designed as a slotted pipe or the like. The filling device according to the disclosure cannot only be used for beverages, but also for particle-shaped products such as powders or granular materials.

The invention claimed is:

1. Filling device for containers, comprising a filling valve with a discharge opening, a holder for the container in a suspended arrangement, and a weighing device where at least one portion of the weighing device is arranged vertically above the discharge opening, wherein the holder is connected to the weighing device by a substantially vertically extending carrier member which is led through a frame part and a lead-through aperture for the carrier member is sealed on one or both sides.

2. The filling device according to claim 1, wherein the weighing device is arranged on two opposing sides and symmetrically with respect to a filling axis.

3. The filling device according to claim 1, wherein the carrier member defines a free space for the discharge opening and a supply line therefore.

4. The filling device according to claim 3, wherein the discharge opening and the supply line are arranged between two opposite arms of the carrier member.

5. The filling device according to claim 1, wherein a supply line for the discharge opening is led through a frame part.

6. The filling device according to claim 1, wherein the discharge opening is closable.

7. The filling device according to claim 1, wherein the containers are beverage bottles.

8. The filling device according to claim 1, wherein a filling axis passes through a body of the weighing device and a center of the discharge opening.

9. Filling device for containers, comprising a filling valve with a discharge opening, a holder for the container in a suspended arrangement, and a weighing device where at least one portion of the weighing device is arranged vertically above the discharge opening, wherein the holder is connected to the weighing device by a substantially vertically extending carrier member which is mounted in a frictionless manner and in a magnetic bearing.

* * * * *